M. H. ALLEN.
EGG CARRIER.
APPLICATION FILED JULY 2, 1914.
1,153,185.
Patented Sept. 14, 1915.
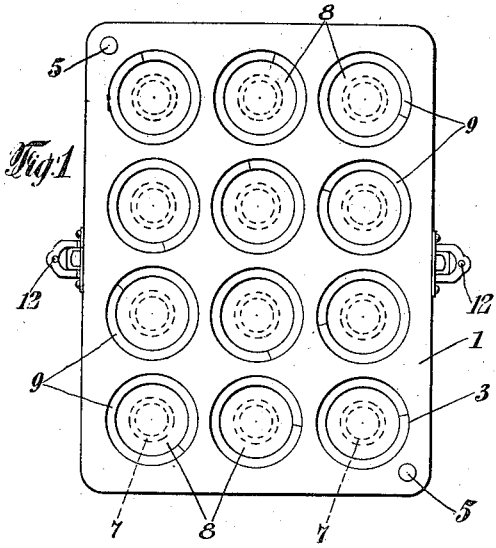
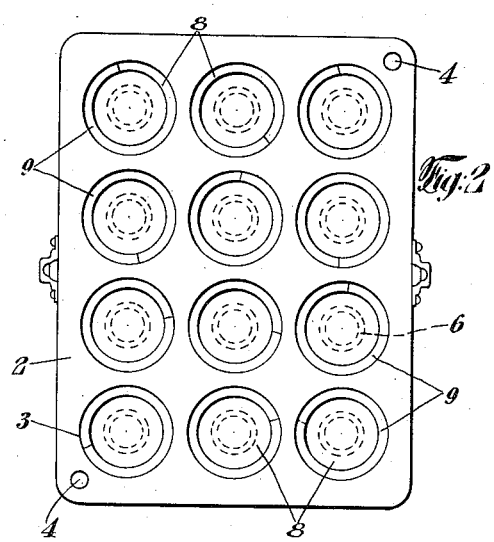
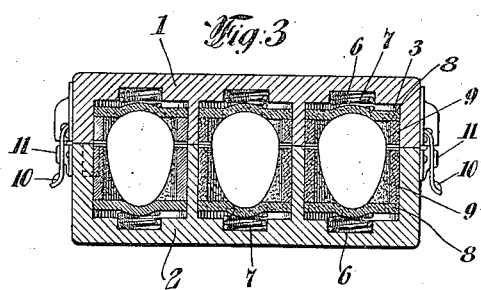
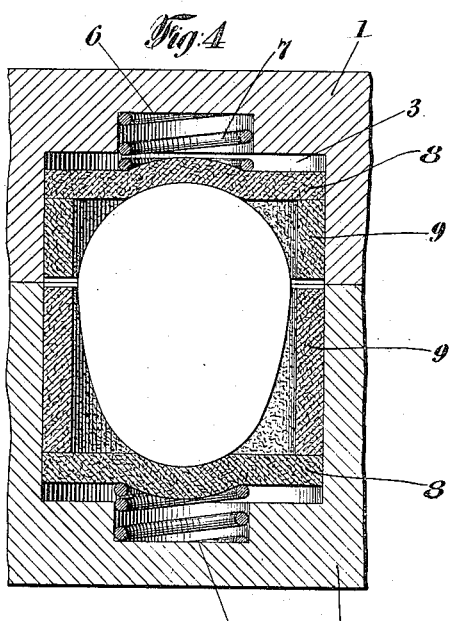
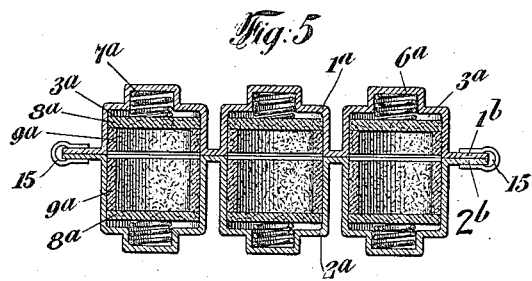
Witnesses:
John E. Prager
A. Worden Gibbs
Myron H. Allen  Inventor
By his Attorneys

UNITED STATES PATENT OFFICE.

MYRON H. ALLEN, OF NEW BRUNSWICK, NEW JERSEY.

EGG-CARRIER.

1,153,185.　　　　　Specification of Letters Patent.　　Patented Sept. 14, 1915.

Application filed July 2, 1914.　Serial No. 848,550.

*To all whom it may concern:*

Be it known that I, MYRON H. ALLEN, a citizen of the United States, residing at New Brunswick, in the county of Middlesex and State of New Jersey, have invented certain new and useful Improvements in Egg-Carriers; and I do hereby declare the following to be a full, clear, and exact description of the invention, such as will enable others skilled in the art to which it appertains to make and use the same.

My invention consists in the novel features hereinafter described, reference being had to the accompanying drawings which illustrate one embodiment in which I have contemplated embodying my invention, and which I have selected for the purpose of illustrating the same, and the said invention is fully disclosed in the following description and claims.

The object of my invention is to provide an egg carrier for shipping eggs whereby the individual eggs will be held and protected from injury during handling and shipment, notwithstanding any amount of rough treatment to which the carrier may be subjected.

In carrying my invention into effect, I employ an inclosing casing, preferably formed in two parts, each of which is provided with a plurality of egg receiving recesses, the recesses of one of said parts registering with those of the other, and forming egg receiving cells, and each of said cells is provided with means for firmly holding the individual egg contained therein in position and protecting it from injury.

Referring to the said drawings, Figure 1 represents a bottom plan view of the top portion or member of my improved egg carrier. Fig. 2 is a top plan view of the bottom portion or member of the same. Fig. 3 is a sectional view through the egg carrier, showing it in closed position, the line of section being taken centrally through one row of egg cells, showing the eggs contained therein. Fig. 4 is an enlarged sectional view of a single cell, showing the egg held in position therein. Fig. 5 is a sectional view showing a slightly modified form of the casing members and means for securing them together.

In Figs. 1, 2, 3, 4, I have shown the casing as comprising two members 1 and 2, the upper member being termed for convenience of reference, the upper casing member, and the member 2 being termed the lower or bottom casing member. These casing members may be formed of wood or other suitable material as paper pulp, compressed or molded in the desired form, or other suitable material, and each of said members is provided with a plurality of egg receiving recesses 3, the recesses of one member registering with those of the other member when the members are placed together, and in order to insure registration, I may provide registering means or interlocking devices, such as dowel pins 4—4 on one of said members, engaging apertures 5—5 in the other as shown herein. These interlocking devices also serve to maintain the casing members in proper relation with each other at all times when they are secured together.

Each of the egg receiving recesses of the members 1 and 2 is provided with an auxiliary recess 6 of less diameter than the recess 3 and preferably formed concentrically therewith as shown. The recesses 6 may be formed by counterboring the members 1 and 2 if they are formed of wood, or by otherwise molding or pressing the auxiliary recesses 6 therein, if they are formed of other material. In each of the recesses 6 is located an elastic annular cushioning device 7, and I prefer to employ for this purpose a spiral spring, as shown. I also provide in each of the recesses of each member a bottom pad 8, which is preferably formed from a thick piece of felt or other soft material, the central portion of which is engaged by the cushioning device or spring 7, and normally held thereby away from the bottom of the recess 3. I also prefer to provide the lateral walls of the recess 3 with annular pads 9—9 which are also formed of elastic or soft compressible material, such as thick felt or other suitable material. The auxiliary recess 6 and the spiral springs 7, located therein, are of such diameter that the end portions of the eggs may indent the cushioning pads 8 somewhat into the central portion of the spring or cushioning device so as to conform with the shape of the egg, and this has the effect of forming concave yielding cushioning devices engaging the opposite ends of the egg and thereby holding them firmly against lateral movement in the cell. The pressure exerted by the springs or cushioning devices will always be in line with the longitudinal axis of the egg in which direction the shell is not at all liable to be injured by any ordinary compression, and as a matter of fact, the springs and end pads 8 will hold the eggs so firmly that they will not ordinarily come in contact with the lateral pads 9 at all, said lateral pads being provided however out of abundant caution, so as to prevent injury to the eggs in placing the eggs in the cells and removing them therefrom, and to provide against injury to the lateral portions of the eggs in case of such severe handling of the casing as might cause them to move slightly laterally with respect to the end holding means.

In forming the members 1 and 2 of the casing, I prefer to have them of unequal heights, that is to say, the bottom member 2 is preferably of greater vertical thickness than the top member, and the recess 3 in the bottom member is correspondingly of greater depth than those of the top member, the recess in the bottom member being preferably about twice the depth as the recess in the top member. This difference in the depths of the recesses in the top and bottom members effects two advantageous results. In packing the eggs into the carrier they are placed in the cell recesses of the lower member 2, and are therefore held in substantially vertical position so that the upper member can be readily placed in engagement therewith. When the eggs are to be removed from the carrier it is preferably inverted and the bottom member 2 is lifted off of the top member and on releasing the compression of the springs, the springs 7 of the casing member 1 will expand, thus raising the eggs sufficiently out of the shallow recesses so that they can be very readily removed.

The two members of the carrier are secured together in any desired manner. In the present instance I have shown the casing members provided with locking devices on opposite sides, the upper members being provided with pivoted bails 10 which engage projections 11 on the lower member, and these bails may be secured in position by means of a wire and lead seal in any desired manner, or by a cord or wire without the seal if desired, and I may provide the bails with apertures 12 through which the cord or wire may extend and be carried entirely around the carrier.

In Fig. 5 I have shown a modification of my invention in which the members of the carriers, here represented at 1ª and 2ª, are formed of thin or sheet material such as sheet metal, paper mâché, card-board, and the like, pressed, stamped, molded, or otherwise formed so as to provide the cell recesses 3ª and the auxiliary recesses 6ª to receive the coil springs 7ª or other elastic cushioning means, the recesses 3ª being provided with the bottom pads 8ª and lateral pads 9ª, as in the form of my invention previously described. The members 1ª and 2ª may be conveniently provided with lateral flanges 1ᵇ and 2ᵇ extending around the same, which not only give additional stiffness to the casing members, but afford convenient means for securing them together in registration, and the casing members may be conveniently secured together by means of spring clips 15, as indicated in Fig. 5, or they may be secured together in other ways. I have contemplated forming these casing members from sheet metal and also from papier mâché, and in the latter case, the extreme cheapness of the device would permit them to be thrown away after they had served their purposes in transporting a plurality of eggs, or the carriers may be returned to the shipper, as preferred.

In using these egg carriers, they are preferably constructed to contain a dozen eggs, but may contain more or less and the eggs are inserted in the recesses in the bottom member 2 and are thereby held in substantially vertical position, the upper member 1 is then placed upon the lower member so as to bring the recesses 3 of the two members in registration, and the casing members are then pressed firmly together and secured, thereby compressing the springs 7 at the pivoted ends of each egg, and causing the ends of the egg to indent the felt pads 8—8 into the central portions of the springs as clearly shown in Figs. 3 and 4, thereby firmly holding each individual egg against movement in any direction between the opposing springs 7, the concave portions of the felt pads 8, as before stated, serving to prevent any lateral movement of the eggs in the cells.

My improved carrier will hold eggs of different sizes as the springs 7 in the cells will adapt themselves to the size of the particular egg placed therein, and the carrier may be subjected to very rough treatment in transportation and handling without in any way injuring the eggs.

My improved carrier is particularly well adapted for the shipment of special settings of eggs which are frequently of very considerable value and injury to which would result in considerable financial loss and the said carrier is also well adapted for the shipment of eggs commercially to the market or private individuals for culinary purposes. The auxiliary recesses not only serve to permit the proper expansion and compression of the springs 7, but also maintain them centrally with respect to the cell recesses and with respect to the longitudinal axis of the egg and prevent them from becoming twisted and from moving laterally when the ends or sides of the casing are subjected to shock or jar.

What I claim and desire to secure by Letters Patent is:—

1. An egg carrier containing separable members provided with oppositely disposed spiral springs, a covering of flexible material for each of said springs, adapted to engage the opposite end portions of the egg and be indented into the adjacent spring coil, whereby the egg will be held between the opposed springs and the yielding coverings therefor against longitudinal and lateral movement, each of said members being provided with lateral guiding portions surrounding portions of the spring carried thereby for preventing lateral movement of the spring.

2. An egg carrier comprising separable members, each provided with an egg receiving recess, adapted to register with the recess of the other member, each member being provided with a spiral spring of less diameter than the said recesses, located concentrically therein and seated against the bottoms of said recesses and projecting slightly out of said recesses, and held from lateral movement, a pad of flexible material in each of said recesses, for engaging an egg, and adapted to be indented into the end of the adjacent spring, to hold the egg against lateral movement, and means for holding said members in assembled relation.

3. An egg carrier comprising separable members provided with registering egg receiving recesses, each having its inner end provided with a concentric recess of smaller diameter, coiled springs located in said smaller recesses, pads of flexible elastic material located in the egg receiving recesses, and engaging the adjacent spring, each of said egg receiving recesses being provided with a lining of flexible elastic material around its lateral walls, and means for holding said members together.

4. An egg carrier comprising separable members, each provided with an egg receiving recess, adapted to register with the recess of the other member, each member being provided with a spiral spring of less diameter than the said recesses, located concentrically therein, and held from lateral movement, a pad of flexible material in each of said recesses, for engaging an egg, and adapted to be indented into the end of the adjacent spring, to hold the egg against lateral movement, the egg receiving recesses in one of said members being of greater depth than those in the other member to facilitate the insertion and removal of the egg.

5. An egg carrier comprising separable members, each provided with registering recesses forming egg receiving cells, each member being provided with an auxiliary recess in the bottom of each of its cell recesses, and yielding cushioning devices located in the said auxiliary recesses and having egg engaging portions, said cushioning devices engaging opposite ends of the eggs and holding them from longitudinal and lateral movement in the cells.

6. An egg carrier comprising separable members, each provided with registering recesses forming egg receiving cells, each member being provided with an auxiliary recess in the bottom of each of its cell recesses, and annular cushioning devices of less diameter than the main recesses, located in said auxiliary recesses for holding the eggs against longitudinal and lateral movement in said cells.

7. An egg carrier comprising separable members, each provided with registering recesses forming egg receiving cells, each member being provided with an auxiliary recess in the bottom of each of its cell recesses, and annular cushioning devices of less diameter than the main recesses located in said auxiliary recesses and projecting into said main recesses, bottom pads of yielding material in said main recesses engaging the ends of said annular cushioning devices, and being adapted to be indented into the central apertures therein, by the end portions of the eggs, to hold the eggs against endwise and lateral movement in the cells, said auxiliary recesses holding the annular cushioning devices against lateral movement.

In testimony whereof I affix my signature, in the presence of two witnesses.

MYRON H. ALLEN.

Witnesses:
E. W. WYATT,
BERTHA B. APPEL.